Oct. 19, 1943.  J. E. BUXTON  2,332,053
ENGINE STARTER DRIVE
Filed Jan. 23, 1941

Witness:
Burr W. Jones

INVENTOR.
James E. Buxton
BY Clinton S. James
ATTORNEY.

Patented Oct. 19, 1943

2,332,053

UNITED STATES PATENT OFFICE 2,332,053

ENGINE STARTER DRIVE

James E. Buxton, Elmira Heights, N. Y., assignor to Bendix Aviation Corporation, South Bend, Ind., a corporation of Delaware Application January 23, 1941, Serial No. 375,635

10 Claims. (Cl. 74—7)

The present invention relates to an engine starter drive and more particularly to gearing for automatically connecting a starting motor to a member of an engine to be started and for disconnecting the starting motor when the engine becomes self-operative.

The present invention is an improved form of true-start drive, that is, a drive which maintains the gears in mesh until the engine is reliably self-operative, and is not disconnected by preliminary weak explosions or false starts of the engine.

It is an object of the present invention to provide a novel engine starter drive of the above type which is simple in construction, reliable in operation and economical to manufacture.

It is another object to provide such a device incorporating a connection which is arranged to transmit cranking torque yieldingly and elastically, and is further arranged to overrun freely when the engine starts.

It is another object to provide such a device in which a block of elastically deformable material is used to yieldably transmit cranking torque and to provide an overrunning clutch connection which permits the starter pinion to overrun the starting motor while the pinion is held in engagement with the engine gear.

It is another object to provide such a device incorporating an auxiliary driving connection for supplementing the elastic torque transmitting means.

It is another object to provide such a device in which the overrunning connection serves to prevent the pinion from bounding back toward the engine gear when demeshing takes place.

Further objects and advantages will be apparent from the following description taken in connection with the accompanying drawing in which.

Figures 1, 2:
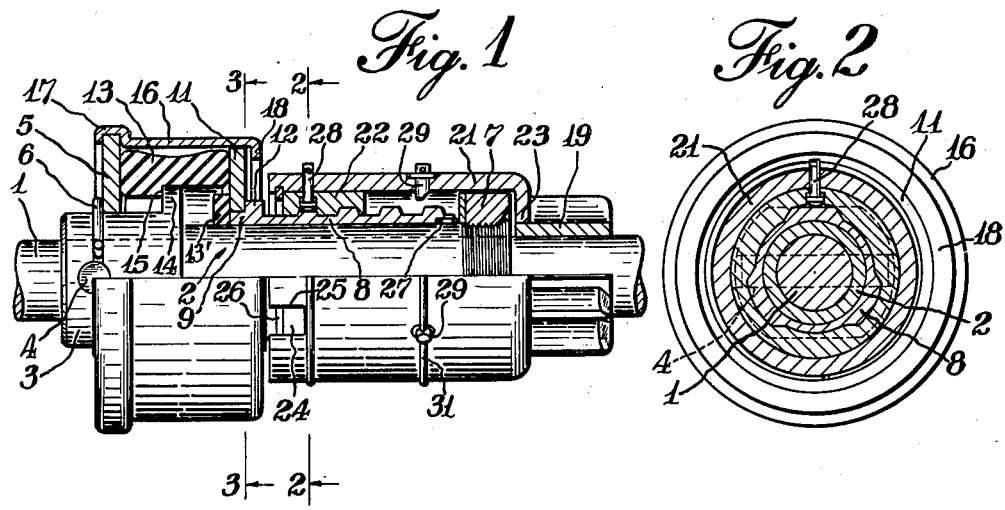
Fig. 1 is a side elevation partly broken away and in section showing a preferred embodiment of the present invention.
Fig. 2 is a section taken substantially on the line 2—2 of Fig. 1.
Figures 3, 4:
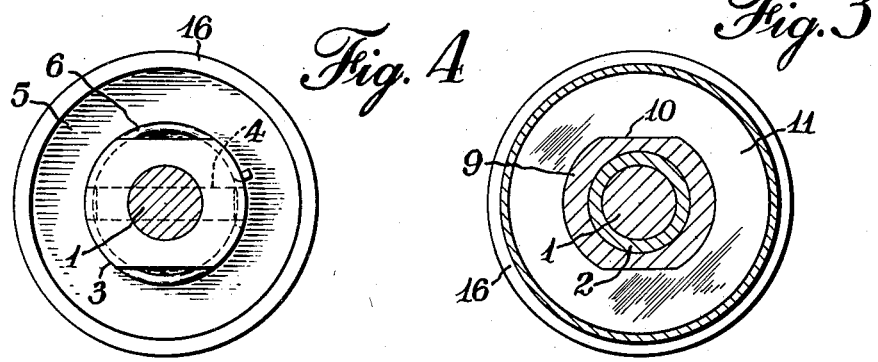
Fig. 3 is a section taken substantially on the line 3—3 of Fig. 1.
Fig. 4 is an end view from the left in Fig. 1.

In Fig. 1 of the drawing there is illustrated a power shaft 1 which may be the extended armature shaft of a starting motor, not illustrated. A cylindrical sleeve 2 having an enlarged portion 3 of "double-D" cross section (Fig. 4) is fixed on the power shaft by suitable means such as a cross pin 4 and has a flange member 5 slidably but non-rotatably mounted on said "double-D" section and held thereon as by means of a split thrust ring 6.

A stop nut 7 is fixedly mounted on the end of the sleeve 2, and a screw shaft 8 is slidably journalled on the sleeve between the enlargement 3 thereof and the stop nut. Screw shaft 8 is provided at one end with an enlarged portion 9 having flats 10 (Fig. 3) machined thereon to form a "double-D" section. A flange member 11 is non-rotatably mounted on the "double-D" portion of the screw shaft in abutting relation with shoulders 12 formed at the ends of the flats 10. A cylindrical block 13 of elastically deformable material such as rubber is interposed loosely between the flange members 5 and 11 and is preferably maintained seated against the flange member 5 by suitable means such as a radial flange 14 formed on the enlarged portion 3 of sleeve 2 and engaging an internal shoulder 15 in the elastic block. A barrel member 16 is arranged to surround the flange members and elastic block to enclose the same and to limit separation of the flange members. As here shown, the barrel 16 is crimped on the periphery of the flange member 5 as indicated at 17 and is provided with an inwardly extending flange 18 which is adapted to engage the flange member 11 and limit separation of the flange members.

A friction washer 13' of suitable material such as fibre may be interposed between the end of screw shaft 8 and the flange 14 if deemed desirable, to furnish an auxiliary frictional connection between the sleeve 2 and screw shaft 8 and to limit the compression of the elastic block 13.

A pinion 19 is slidably journalled on the power shaft 1 for movement into and out of engagement with a gear 20 of the engine to be started. The pinion is rigidly connected by means of a barrel 21 with a nut 22 threaded on the screw shaft 8. As here shown, the barrel is fixed to the pinion by any suitable means as by brazing it to the hub of the pinion as indicated at 23, and the nut 22 is fixed to the barrel by means of radial lugs 24 on the nut extending into slots 25 of the barrel and retained by a split lock ring 26.

Means are preferably provided for normally maintaining the flange member 11 in light frictional engagement with the elastic block 13. As here shown, this means is in the form of a light compression spring 27 interposed between the end of the screw shaft 8 and the stop nut 7. Antidrift means such as a yielding detent 28 is preferably provided for normally holding the pinion and barrel in retracted position as illustrated in Fig. 1.

According to the present invention, means are provided for holding the pinion 19 in engagement with the engine gear 20 until the pinion is rotated by the engine gear above a predetermined speed. As here shown, this means is in the form of one or more centrifugal latches 29 slidably mounted in the barrel 21 in position to engage the stop nut 7 and prevent retrograde motion of the barrel and pinion. The centrifugal latches 29 are yieldingly urged toward engaging position by suitable means such as a spring member 31, the weight of the latches and the strength of the spring being so related as to cause the latches to move out and release the pinion when the pinion and barrel assembly is rotating at a predetermined speed.

In operation, starting with the parts in the positions illustrated in Fig. 1, rotation of the power shaft 1 by the starting motor is transmitted through the pin 4 to the sleeve 2, and by the flange member 5 and flange 14 to the elastic block 13. Screw shaft 8 is thereby caused to rotate by reason of its engagement on the sleeve 2 and also by reason of the light frictional engagement of the flange member 11 with the elastic block 13. This rotation of the screw shaft causes the nut to be translated to the right in Fig. 1, thus moving the pinion 19 into engagement with the engine gear 20, in which position the control nut 22 engages the stop nut 7 which limits the travel of the pinion and defines its operative position. The resistance of the nut 22 to longitudinal travel to the right causes the screw shaft 8 to move to the left, thus compressing the elastic block 13 by the screw jack action of the screw shaft and nut so as to enable the transmission of cranking torque therethrough. When the friction washer 13' is employed, the compression of the elastic block is limited by the engagement of said washer with the flange 14 of sleeve 2. Thereafter the washer 13' serves as an auxiliary friction clutch member connecting the sleeve 2 with the screw shaft 8.

Figure 5:
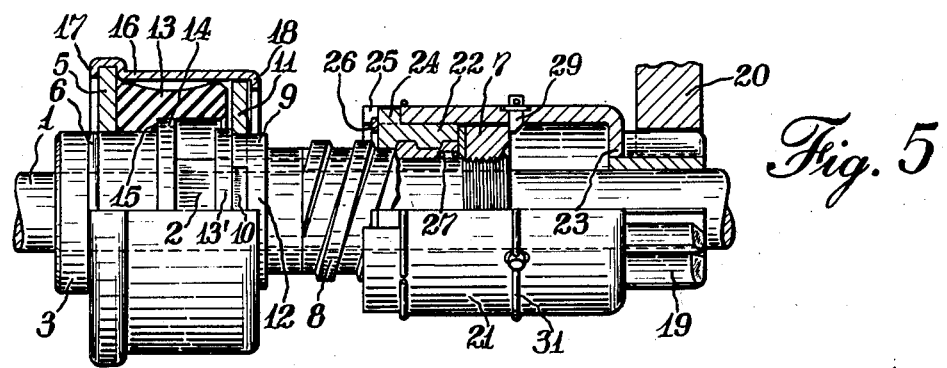
Fig. 5 is a view similar to Fig. 1 showing the parts in the positions assumed when the pinion is driven by the engine gear so as to overrun the starting motor while being held in mesh with the engine gear.

When the initial explosions of the engine occur, the consequent acceleration of the engine gear causes the pinion to overrun the starting motor, whereupon the screw shaft 8 is drawn to the right to the position shown in Fig. 5 where the flange 11 is completely separated from the elastic block 13. The pinion, barrel and screw shaft assembly are thus permitted to overrun freely without transmitting any substantial amount of torque to the starting motor which might cause it to be accelerated undesirably. During this time, the pinion is maintained in mesh with the engine gear by the engagement of the centrifugal latches 29 with the stop nut 7.

If the engine should fail to continue in operation after one or more initial explosions, the rotation of the pinion 19 by the engine gear will decelerate, and the rotation of the starting motor will accelerate the power shaft 1 until it catches up with the pinion 19, whereupon the screw shaft 8 will again be moved to the left into engagement with the elastic member 13 and cranking will be resumed. When the engine becomes reliably self-operative, the consequent speed of rotation of the pinion 19 exceeds the setting of the centrifugal latches 29 whereby said latches move out and permit barrel 21 and pinion 19 to be returned to idle position by the traversing action of the screw shaft 8, in which position these parts are yieldably maintained by the antidrift detent 28. The backward movement of the pinion and barrel is arrested by the engagement thereof with the end of the sleeve 2 and stop nut 7. After such engagement the pinion and barrel assembly may overrun the sleeve 2 and power shaft 1 until its rotational energy is dissipated, the screw shaft 8 being moved to the right by its threaded connection with the barrel until the flange 9 is disengaged from the elastic member 13, thereby permitting the screw shaft to rotate freely with the barrel.

When the momentum of the pinion and is associated parts is dissipated, it may happen that the flange 11 of screw shaft 8 remains disengaged from the elastic element 13 in spite of the action of the small spring 27. In such case, the next actuation of the power shaft 1 for starting purposes causes rotation of the screw shaft by virtue of its frictional engagement with the sleeve 2 assisted by the action of spring 27, whereupon the threaded connection of the screw shaft with the pinion barrel cooperates with the spring 27 to move the flange 11 into initial frictional engagement with the elastic element 13, after which the starting operation proceeds as usual.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In an engine starter drive, a screw shaft, a nut threaded thereon, a pinion connected for actuation by the nut, a stop for the nut, and means for rotating the screw shaft including a rotatable flange member, a flange on the end of the screw shaft adjacent thereto, a block of elastically deformable material interposed between the flange members, and means for holding one of the flanges out of engagement with said block when the pinion overruns the rotating means.

2. In an engine starter drive a power shaft, a screw shaft slidably journalled thereon, a nut threaded on the screw shaft, a barrel fixed to the nut, a pinion fixed to the barrel and slidably journalled on the power shaft for engagement with an engine member, a fixed stop for the nut within the barrel located between the nut and pinion, a driving flange member fixed to the power shaft, a driven flange member fixed to the screw shaft, and a block of elastically deformable material interposed between said flanges and adapted to be compressed thereby to form a driving connection therebetween by the screw jack action of the screw and nut when the nut engages said stop, said driving connection being disengaged by said screw jack action so as to overrun freely when the engine starts and causes the pinion to overrun the power shaft.

3. In an engine starter drive, a power shaft, a pinion slidably journalled thereon for movement into and out of engagement with an engine gear, means for actuating the pinion from the power shaft including a self-tightening friction clutch, a stop member rigidly connected to the shaft, means connected to rotate positively with the pinion adapted to engage the stop member to hold the pinion in mesh with the engine gear, and means for separating the members of the friction clutch when the engine becomes self-operative.

4. In an engine starter drive, a power shaft, a pinion slidably journalled thereon for movement into and out of engagement with an engine gear, means actuated by the power shaft for moving the pinion into engagement with the engine member and thereafter rotating the pinion, said means including a pair of flange members, a block of elastically deformable material therebetween, and means for compressing said block between the flanges to form an elastic connection therebetween; and means for disengaging said connection to allow the pinion to overrun freely when the engine becomes self-operative.

5. In an engine starter drive, a power shaft, a pinion slidably journalled thereon for movement into and out of engagement with an engine gear, means actuated by the power shaft for moving the pinion into engagement with the engine member and thereafter rotating the pinion, said means including a pair of flange members, a block of elastically deformable material therebetween, and means for compressing said block between the flanges to form an elastic frictional connection therebetween; and centrifugal means for causing disengagement of said connection and holding the pinion in engagement with the engine member when the engine becomes initially self-operative.

6. In an engine starter drive, a power shaft, a pinion slidably journalled thereon for movement into and out of engagement with an engine gear, means for actuating the pinion from the power shaft including a friction clutch, means normally holding the clutch in light frictional engagement, means for tightening the clutch to transmit rotation to the pinion when the engaging movement of the pinion is completed, an abutment rigidly connected to the shaft, a latch connected to rotate positively with the pinion adapted to engage the abutment to hold the pinion in engagement with the engine member, and means for disengaging the members of the clutch when the engine overruns the power shaft, said latch being arranged to be withdrawn by centrifugal force and permit demeshing of the pinion when the pinion rotates above a predetermined speed.

7. In an engine starter drive, a power shaft, a pinion slidably journalled thereon for movement into and out of engagement with an engine gear, means for actuating the pinion from the power shaft including a driving flange member, a driven flange member and a block of elastically deformable material interposed therebetween, means normally holding the flange members in light frictional engagement with the elastically deformable material, means for compressing the elastically deformable material between the flanges when the engaging movement of the pinion is completed in order to form a frictional yielding driving connection between said flanges, and means responsive to self-operation of the engine for disengaging said frictional connection so as to permit the pinion to overrun the power shaft freely while remaining in engagement with the engine member.

8. In an engine starter drive, a power shaft, a pinion slidably journalled thereon for movement into and out of engagement with an engine gear, means for actuating the pinion from the power shaft including a driving flange member, a driven flange member and a block of elastically deformable material interposed therebetween, means normally holding the flange members in light frictional engagement with the elastically deformable material, means for compressing the elastically deformable material between the flanges when the engaging movement of the pinion is completed in order to form a frictional yielding driving connection between said flanges, means responsive to overrunning of the pinion due to the self-operation of the engine for disengaging the frictional connection, and means for holding the pinion in engagement with the engine member until the pinion is rotated at a predetermined speed.

9. In an engine starter drive, a power shaft, a pinion slidably journalled thereon for movement into and out of engagement with an engine member, means for actuating the pinion from the power shaft including a pair of flange members, a block of elastically deformable material, and means for compressing the block between the flanges to form an elastic connection, an auxiliary frictional connection between the power shaft and pinion established after a predetermined compression of the elastic block, and means for disengaging both said connections when the engine becomes self-operative.

10. In an engine starter drive, a power shaft, a pinion slidably journalled thereon for movement into and out of engagement with an engine member, means for actuating the pinion from the power shaft including a pair of flange members, a block of elastically deformable material, and means for compressing the block between the flanges to form an elastic connection, a friction clutch adapted to connect the flange members after a predetermined load has been applied to the elastic block, and means for disconnecting the flange members to allow the pinion to overrun the power shaft when the engine becomes self-operative.

JAMES E. BUXTON.